United States Patent [19]

Naganuma et al.

[11] Patent Number: 5,537,339

[45] Date of Patent: Jul. 16, 1996

[54] METHOD OF OPERATING A PLURALITY OF UTILITIES, A UTILITIES NETWORK SYSTEM FOR CARRYING OUT THE METHOD AND A CONTROL DEVICE FOR SUCH A NETWORK

[75] Inventors: Yoshio Naganuma, Katsuta; Akihiro Yamada, Hitachi, both of Japan; Ichiro Enbutsu, Goleta, Calif.; Kenji Baba, Hitachi, Japan

[73] Assignee: Hitachi, Ltd., Tokyo, Japan

[21] Appl. No.: 197,278

[22] Filed: Feb. 16, 1994

[30] Foreign Application Priority Data

Feb. 24, 1993 [JP] Japan ................................. 5-035165

[51] Int. Cl.⁶ .................................................. G06F 19/00
[52] U.S. Cl. .......................... 364/550; 364/550; 364/492; 340/870.02
[58] Field of Search ...................... 364/493, 492, 364/550; 340/870.02, 870.03, 870.06, 825, 825.52, 825.07, 310.07, 870.39, 870; 47/1.42; 379/107, 102

[56] References Cited

U.S. PATENT DOCUMENTS

| | | | |
|---|---|---|---|
| 3,702,460 | 11/1972 | Blose | 340/150 |
| 4,146,923 | 3/1979 | Borkan | 364/492 |
| 4,264,960 | 4/1981 | Gurr | 364/492 |
| 4,520,274 | 5/1985 | Stants | 364/493 |
| 4,685,307 | 8/1987 | Jones | 62/160 |
| 4,924,404 | 5/1990 | Reinke, Jr. | 364/550 |
| 4,951,234 | 8/1990 | Bellows | 364/550 |
| 5,319,571 | 6/1994 | Langer et al. | 364/493 |
| 5,329,464 | 7/1994 | Sumic et al. | 364/492 |
| 5,384,712 | 1/1995 | Oravetz et al. | 364/550 |
| 5,404,136 | 4/1995 | Marsden | 364/493 |
| 5,408,607 | 4/1995 | Nishikawa et al. | 395/200 |

FOREIGN PATENT DOCUMENTS

| | | |
|---|---|---|
| 2283578 | 3/1976 | France . |
| 3002957 | 7/1981 | Germany . |
| 4-97401 | 3/1992 | Japan . |
| 4-131600 | 5/1992 | Japan . |

OTHER PUBLICATIONS

"Expert Systems and Their Applications in Energy Management", M. Baba, et al, Conference Proceedings IEEE Southeastcon 86, Mar. 1986.

"Information Routing and Reliability Issues in Distributed Sensor Networks", S. Sitharama et al, IEEE Transactions on Signal Processing, vol. 40, No. 12, Dec. 1992, pp. 3012–3020.

*Primary Examiner*—Emanuel T. Voeltz
*Assistant Examiner*—Demetra R. Smith
*Attorney, Agent, or Firm*—Antonelli, Terry, Stout & Kraus

[57] ABSTRACT

In order to operate a plurality of utilities, the utilities are interconnected via a communication path. Each utility has a control device for controlling the utility and a memory for storing information factors which are used by the corresponding control device. The information factors corresponding to all the utilities are investigated by an extraction device to determine which are common to the utilities and which are related. Where the common information factors are identified, they are passed by the communication path to the memories of all the utilities. Similarly, when related information factors are found, a calculating device calculates common information which is also passed via the communication path to the memories of all the utilities. In this way, the utilities may operate more efficiently than when they are operated on a stand-alone basis. The investigation of the information factors, and the calculating of common information from related information factors may be distributed among the utilities or carried out by a common control device. The utilities may be electric power supply systems, district heating and cooling systems, sewage disposal systems, waste recovery systems, etc.

19 Claims, 5 Drawing Sheets

METHOD OF OPERATING A PLURALITY OF UTILITIES, A UTILITIES NETWORK SYSTEM FOR CARRYING OUT THE METHOD AND A CONTROL DEVICE FOR SUCH A NETWORK

BACKGROUND OF THE INVENTION

The present invention relates to a method of operating a plurality of utilities in a geographical region, such as a town or city. The present invention also relates to a utilities network system for carrying out the method, and to a control device for such a network system.

It is well known to provide computer control of one or more utilities serving a geographical region, such as a town or city. For example, a utility such as an electric power supply network, including one or more power stations and a grid of transmission lines, may be controlled in dependence on the power required by the users connected to the network. The computer control seeks to achieve optimum power generation in dependence on predicted and actual power requirements. Similar control of utilities such as water supply and/or sewage networks may be achieved using suitable computer systems. Moreover, the increasing power of computer systems has enabled computer control of other utilities, such as a road network traffic control system, to ensure that traffic flows as smoothly as possible, without traffic jams. In general, in the prior art, each such utility has been operated independently of all other utilities serving the geographical region. No account has been taken of the effects of one utility on another.

There have been proposals for physical integration of utilities, such as generating electric power using heat produced from waste disposal. Thus, JP-A-4-97401 disclosed an integrated utilities plant in which various utilities were physically integrated, so that energy resources could be transferred between such utilities.

Furthermore, JP-A-4-131600 disclosed a plan for supplying heat to a community in which the plant was run on the basis of predicted variations in heat demand, but also on the basis of a modification based on the number of people in the community at any time.

SUMMARY OF THE PRESENT INVENTION

In general, all utilities are run on the basis of a plurality of information factors relating to that utility. Thus, for example, a district heating and cooling system will be run on the basis of the number of houses supplied, the amount of heat supplied thereto, the amount of power lost, the pipe network system for supplying the heating, etc. The present invention originates in the idea that one or more of the information factors of one utility may be common, or at least related, to an information factor of another utility.

Therefore, in its most general aspect, the present invention proposes that information factors used by a plurality of utilities are investigated, to determine whether any are related. When such related information factors are found, common information is derived which is then supplied to all the utilities. In this way, there is greater integration among the utilities and therefore they operate more efficiently.

The present invention thus involves data transfer between the utilities and it is thus unrelated to JP-A-4-97401, in which there is physical interconnection. Since at least some of the utilities serving a geographical location will already exist, it is not practical to provide physically integrated utility network systems. Since the present invention requires only data transfer between utilities, it is possible to achieve the invention without building of the utility network systems.

For some utility network systems, at least one of the information factors will be common. Thus, surface water management systems (e.g. control of rivers, canals, lakes, etc.) and building management systems (e.g. air conditioning systems, etc.) will both need to take into account the ambient air temperature in the geographical region. Thus, there will be situations where the information factors identified will, in fact, be the same and common information can then be supplied to the utilities directly.

However, there are more complex situations. For some utilities, the common information that is generated will need to be derived from the information factors of the utilities. Thus, atmospheric pollution in an area is affected by the movement of vehicles through that area. Similarly, power generation systems within the area will also produce pollution. When considered independently, neither utility will need to make use of pollution information. However, if common pollution information is derived from the two utilities, that common information may then be used by both to control the pollution within the geographical area.

In order to achieve the invention, the plurality of utilities will need to be connected in a network. The identification of related information factors, and the derivation of common information, may then be carried out centrally, in a separate common control device, or may be carried out in any one or more of the control means of the individual utilities themselves. The latter is simpler to achieve, since it does not require any additional structure except the interconnection of the utilities. However, for processing purposes, it may be easier to transmit the information factors to a common site, rather than to have exchange of information factors between many sites.

The present invention is applicable to many types of utilities. For example, an electricity supply system and a district heating and cooling system will both make use of power information since the amount of power dissipated from the electricity supply system will reduce the amount of heating needed to be supplied by the district heating and cooling system. Similarly, a sewage disposal system and a waste disposal system will both make use of information relating to the amount of waste that will be produced in a region. It has already been mentioned that, for pollution control, a vehicle management system and a power generating system may make use of common information, and similar pollution control information may be used to control a district heating and cooling system.

Although the present invention has been discussed above in relation to a system involving a plurality of utilities connected in a network, the present invention also relates to a control device for such a system, and to a method of operating such a utilities network system.

BRIEF DESCRIPTION OF THE DRAWINGS

Embodiments of the present invention will now be described in detail, by way of example, with reference to the accompanying drawings, in which.

DETAILED DESCRIPTION

Figure 1:
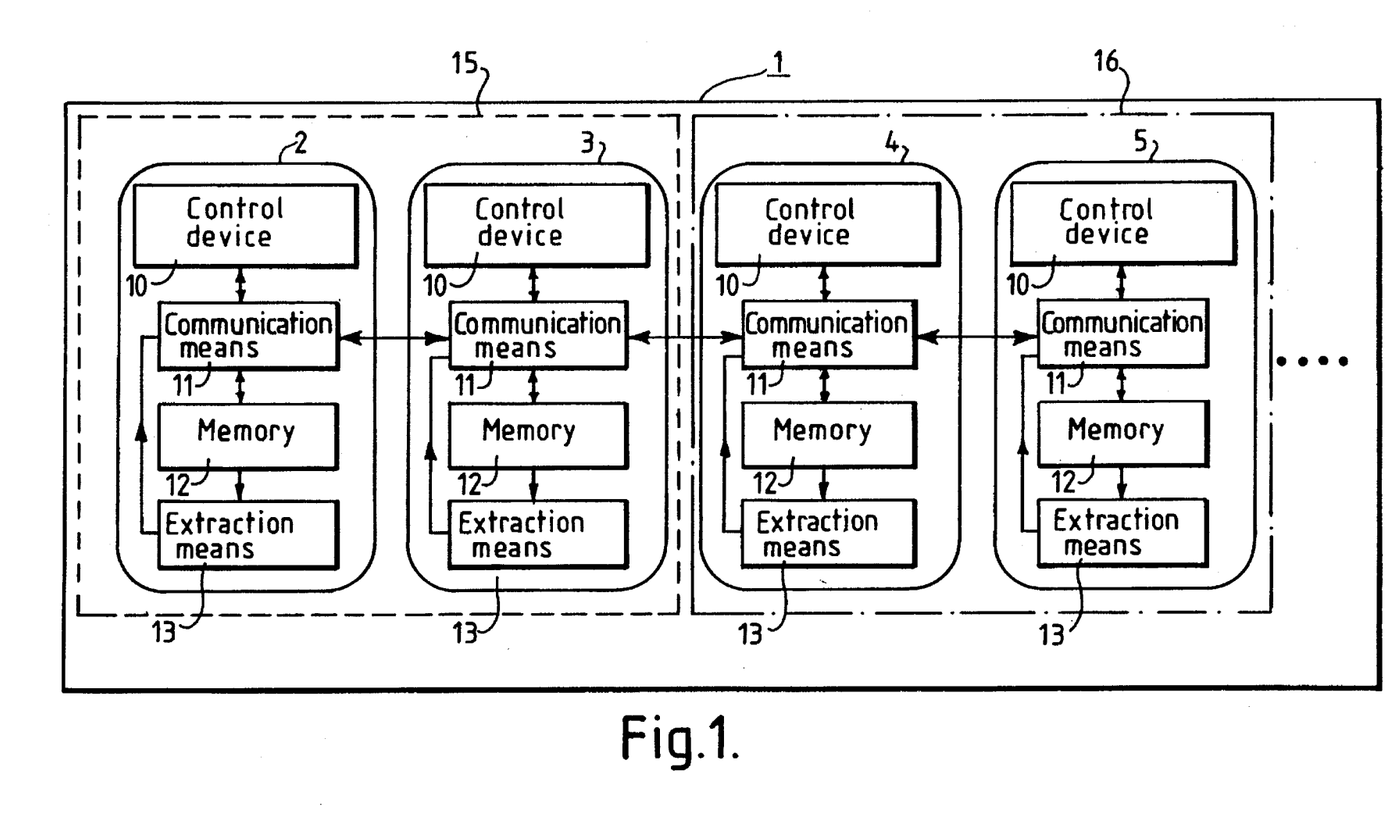
FIG. 1 shows a utilities network system being a first embodiment of the present invention.

A first embodiment of the present invention is shown in FIG. 1. In FIG. 1, a city 1 has a plurality of urban utility systems (utilities) 2 to 5. In FIG. 1, the utility systems are shown schematically, and no details are given of the physical structure of each utility system, since the structure of each utility system, when considered separately, may be conventional. Thus, for example, the utility systems 2 to 5 in FIG. 1 may represent an electric power supply system, a district heating and cooling system, a sewage disposal system and a waste recovery system respectively.

Each utility system 2 to 5 has an operation/management control device 10 which controls the physical structure of the utility. The control device 10 of each utility system 2 to 5 is connected via a communication means 11 to an information memory 12, which stores information factors which will be needed by the control device 10 of each utility system 2 to 5.

As shown in FIG. 1, the communication means 11 of each utility system 2 to 5 are interconnected. This interconnection may be achieved by telephone lines, private lines, LANs, WANs or ISDNs. This interconnection of the communication means 11 permits information factors to be transferred from the memory 12 of one utility system to the memory 12 of another utility system. Preferably, such transmission of information occurs on-line. However, for some utility systems, speed of response is not critical, and so off-line transmission may be used.

It can thus be seen that the only interconnection proposed by this embodiment of the present invention is between the communication means 11 of the utility systems 2 to 5. There are no physical components of the utility systems 2 to 5 which are common.

Each of the utility systems 2 to 5 has an information extraction means 13. When information features have been transferred between the utility systems 2 to 5, the extraction means 13 of each utility system 2 to 5 investigates the information factors to determine whether any are common, or related. Where such common or related information factors are identified, they are transmitted from the extraction means 13 to the communication means 11, and hence to some or all of the other utility systems 2 to 5. It should be noted that, depending on the nature of the utility systems 2 to 5, information factors and/or common information extracted by the extraction means 13 may be transferred only among groups of the utility systems 2 to 5. Thus, utility systems 2 and 3 may form a first group 15 and utility systems 4 and 5 may form a second group 16.

Next, the operation of this embodiment will be described. It will be assumed that the utility systems 2 to 5 are of the type and operate on the basis of the information factors shown in Table 1.

TABLE 1

| | Operation/management information |
|---|---|
| 2. Electric power supply system | Number of houses supplied with power<br>Power generated<br>Area supplied with power<br>Heat dissipated<br>Transmission line network |
| 3. District heating and cooling system | Number of houses supplied with power<br>Heat supplied<br>Power consumed<br>Piping laid |
| 4. Sewage disposal system | Area covered<br>Amount of sewage treated<br>Temperature of sewage<br>Rainfall<br>Sewer piping laid<br>Amount of waste recovered |
| 5. Waste recovery system | Area covered<br>Amount of waste produced<br>Dispatch of waste-collecting vehicles |

The information factors of the electric power supply system and the district heating and cooling system include information relating to power generation and power consumption respectively. Thus, energy is an information factor for both utility systems. For this reason, the extraction means 13 derives information relating to power consumption from the operation/management information factors of the district heating and cooling system (or vice versa) and derives common energy information which is then used by the control means 10 of both the electric power supply system and the district heating and cooling system. Thus, when, for example, it is detected that the power consumption in the district heating and cooling system has increased, the electric power supply system is controlled to increase the power generation accordingly.

In such control, the electric power supply system makes direct use of information factors relating to energy consumption by other facilities. This enables more efficient operation of the electric power supply system than can be obtained using only a conventional operation schedule based on power demand forecasts. This in turn saves fuel used for generation of electricity and reduces the environmental burden of carbon dioxide emission.

In this embodiment, information factors relating to the power consumption of the district heating and cooling system are used as common information. If the information factors used by another associated urban facility system, such as a sewage disposal system or railroad system, has power consumption information, this information may also be transmitted between the utility systems 2 to 5 by the communication means 11 and it can be used in a similar way to that previously described. Hence, it is evident that the effect of reducing the environmental burden of the whole city can be improved.

It will be appreciated that the district heating and cooling system will itself use the power generation information as common information, and thus permit it to estimate the power consumption of other facilities. The district heating and cooling system can also then determine the thermal energy demand which changes with power consumption. Based on the predicted heat energy demand, the energy plants can be operated efficiently, and the power consumed by the plants can be reduced by supplying heat from heat storage tanks and by other appropriate uses of energy.

In this way, by utilizing common information derived from the information factors of other associated utilities, each utility system 2 to 5 can be controlled in synchronism with the control of the other utility systems, and the overall energy consumption of the urban utility systems can be reduced.

Table 1 also shows that a sewage disposal system and a waste recovery system also have related information factors, namely the amount of waste recovered and the amount of waste produced. These systems may thus be combined to form an urban utility system management group. In this group management, the waste recovery system makes use of information relating to the amount of waste recovered (including sedimented sludge, excess sludge and foreign matter screened out), that is recovered from sewage by the sewage disposal system and predicts the amount of waste produced in the area covered by both the sewage disposal system and the waste recovery system. As a result, the waste recovery system can, for example, dispatch waste-collecting vehicles efficiently to specified locations, such as sewage disposal plants.

From the amount of waste produced in the area covered by the waste recovery system, the sewage disposal system can predict the amount of waste, such as screened foreign matter, flowing into the sewage pipes. Using this prediction, the cleaning of sewage pipes and channels and screens can be carried out efficiently.

As described above, the information factors of each urban utility system are inter-linked by the communication means 11 to permit common information to be transmitted between the utility systems 2 to 5. Hence, effective management of the utility system can be achieved.

In the first embodiment described above, it is assumed that one or more of the information factors of one of the utility systems 2 to 5 may be used directly as common information by another of the utility systems 2 to 5. In some situations, this is not the case and the common information needs to be calculated using the information factors. For example, there is no information factor which is common to the district heating and cooling system, the sewage disposal system and the waste recovery system. However, information factors may be related and thus it remains possible to derive common information.

Figure 2:
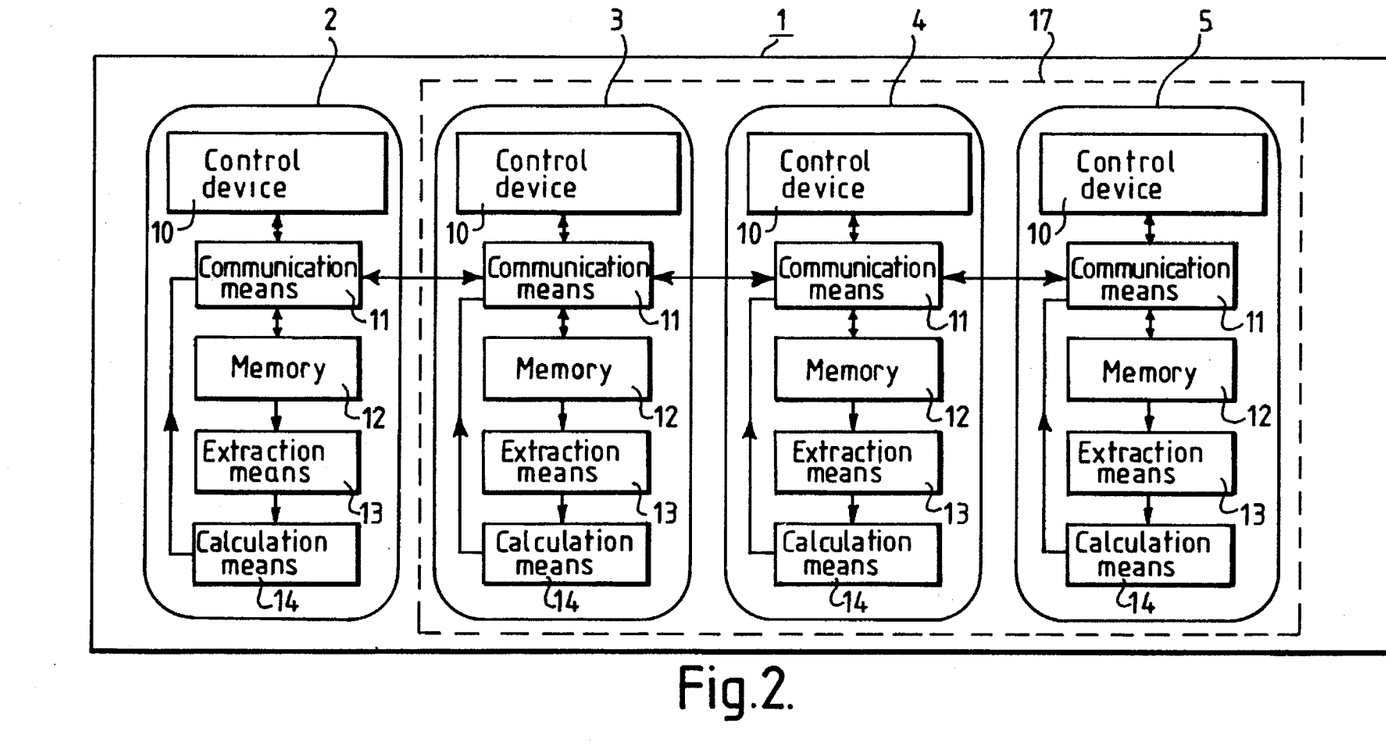
FIG. 2 shows a utilities network system being a second embodiment of the present invention.

The second embodiment of the present invention, shown in FIG. 2, seeks to achieve this. In the second embodiment, each extraction means 13 seeks to identify information factors which are related among the utility systems 2 to 5. Furthermore, each utility system 2 to 5 has a calculation means 14 connected to the extraction means 13. When related information is found, the calculation means 14 derives common information therefrom and passes that common information to the corresponding communications means 11 for transmission to the memories 12 of each utility system 2 to 5. That common information which has been derived by the calculation means 14 may then be used by the control device 10 of each utility system 2 to 5.

The operation of the second embodiment of FIG. 2 will now be described, again using the utility systems and information factors shown in Table 1 as examples.

When a group of urban utility systems made up of a district heating and cooling system, a sewage disposal system and a waste recovery system is considered from the standpoint of effective use of unused energy, the amount of heat can be taken as common information. In this case, while the district heating and cooling system has the amount of heat as one of its information factors, the other two urban utility systems have no such information factor. The sewage disposal system, however, has information relating to the amount of sewage treated and the sewage temperature. If the specific heat thereof is known, it is possible to calculate the amount of heat held by the sewage. For the waste recovery system, if information relating to the amount of flammable materials is known and the amount of heat generated by such flammable materials when they are burned is derived, it is possible to determine the amount of heat available by burning the waste.

The district heating and cooling system therefore can obtain, from the sewage disposal system and the waste recovery system, information relating to the amount of unused energy available. As a result, common information (in this case the amount of heat) can be derived and the district cooling and heating system can operate making use of the unused energy in the geographical region of the systems, thereby ensuring efficient running with a minimum level of energy consumption.

Also, the sewage disposal system and the waste recovery system can use such common information to enhance the accuracy of prediction of the amount of waste produced and sewage temperature by using the information relating to the amount of heat supplied by the district cooling and heating system as a factor for estimating the level of activity in the geographical region. Hence, the operation and management of each utility system can be carried out with a high efficiency. Thus, the provision of the calculation means 14 increases the number of inter-relationships of information that can be derived and used by the utility systems 2 to 5, facilitating the management of the entire region.

Figure 3:
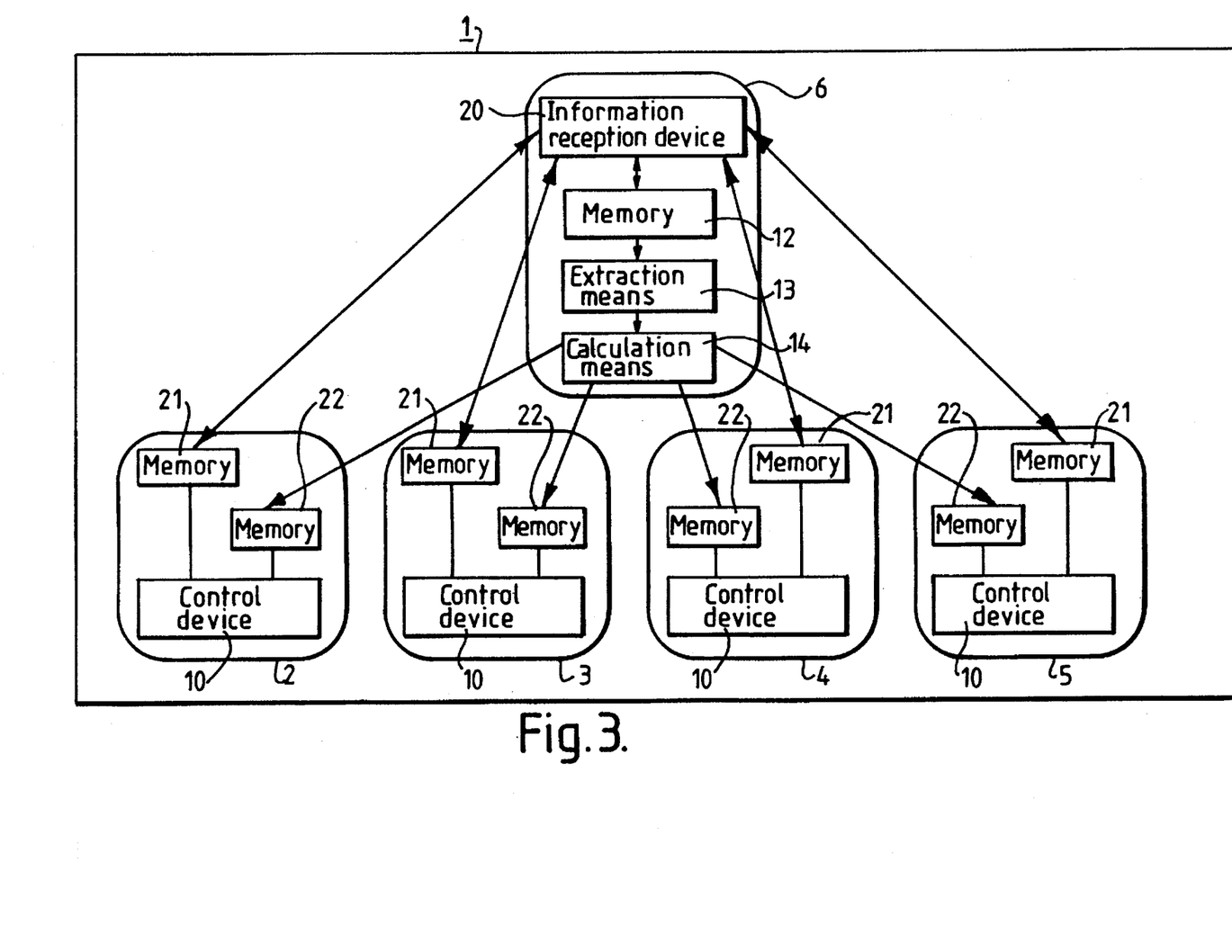
FIG. 3 shows a utilities network system being a third embodiment of the present invention.

In the first two embodiments described above, the derivation of the common information is distributed among the utility systems 2 to 5. FIG. 3 illustrates a third embodiment, in which this operation is centralized. In the embodiment of FIG. 3, there are again utility systems 2 to 5, each with its own control device 10. However, each utility system 2 to 5 is connected to a common control device 6. That common control device 6 has an information reception device 20, and a memory 12, extraction means 13 and calculation means 14 which may be the same as in any one of the utility systems shown in FIGS. 1 or 2. In each utility system 2 to 5, there is a memory 21 which stores information factors used by the corresponding utility system. Those information factors are received by the common control means 6 via the information reception device 20, stored in the memory 12, and related or common information is identified by the extraction means 13. Where common or related information is found, or derived by the calculations means 14, the common information is then re-transmitted to the utility systems 2 to 5, where it is stored in a further memory 22. Then, the control device 10 of each utility system 2 to 5 may make use of the information in both memories 21 and 22 for operation thereof. Of course, it is possible for the memories 21 and 22 to be integrated in a common memory device of the utility system 2 to 5. In such an embodiment, the memory 12 of the common control device 6 needs to be large, since it needs to store all the information factors of all the utility systems 2 to 5. However, since the information factors are stored centrally, the identification of common information factors, or the calculation of common information, can be performed easily.

In this third embodiment, shown in FIG. 3, the utility systems 2 to 5 may be, for example, the same as shown in Table 1. In addition, this embodiment may make better use of spatial information of any of the embodiments of FIGS. 1 and 2, because the information about the utility systems 2 to 5 is centralized. This will be explained further with reference to FIG. 4.

Figure 4:
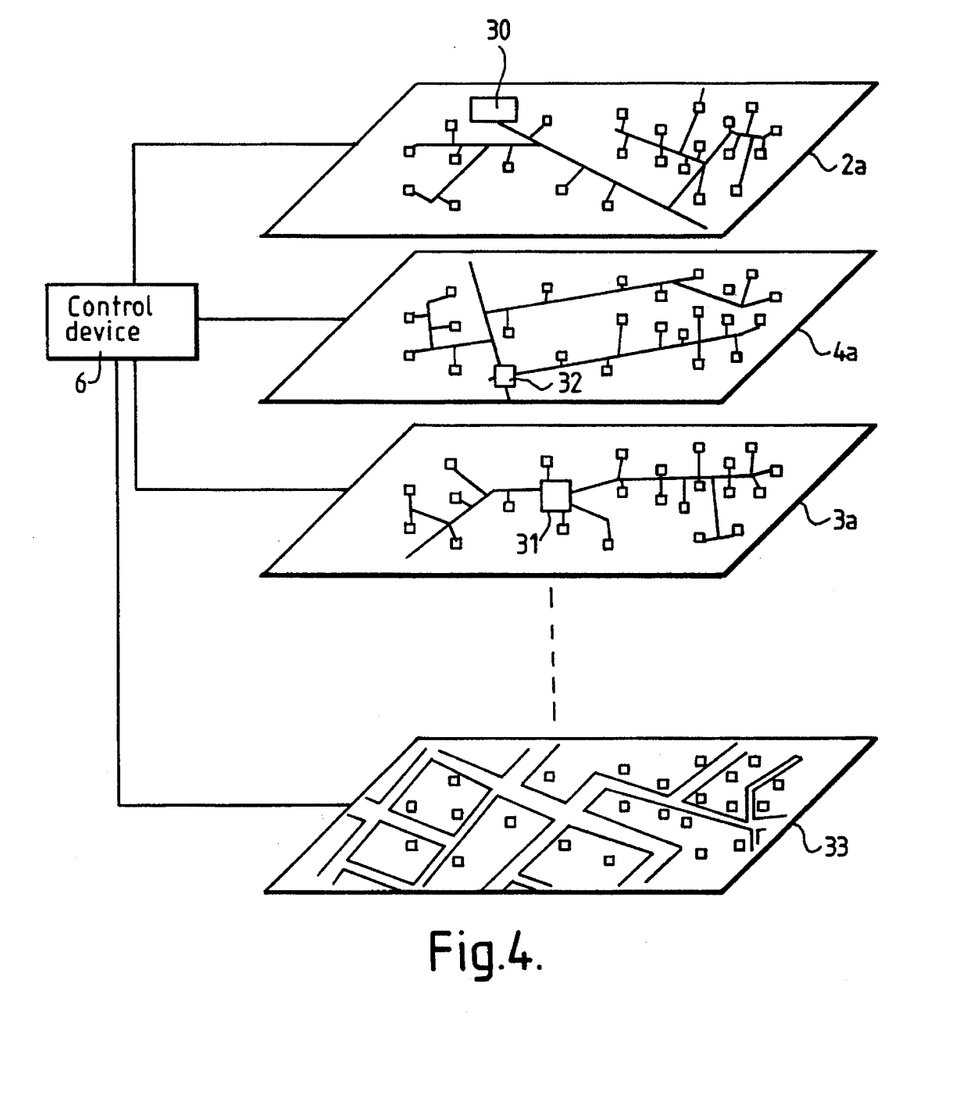
FIG. 4 shows schematically utilities maps that may be used in the embodiment of FIG. 3.

It will be appreciated that, depending on the nature thereof, some or all of the utility systems 2 to 5 will have their own maps showing the geographical organization of the utility system. Thus, for example, an electric power supply system may have a map showing the electricity transmission lines, the waste recovery system may have a map showing the routes taking by waste recovery vehicles, etc. FIG. 4 shows examples 2A to 4A of such maps, which are stored in the memories 21 of the utility systems 2 to 5 in FIG. 4. The information relating to such maps 2A to 4A may then be transmitted to the common control device 6. The common control device 6 may then derive useful information by comparison of the maps 2A to 4A. In particular, such an arrangement permits the common control device 6 to make use of the geographical relationship between the locations of, e.g. a power plant 30, an energy supply site 31, and a pumping station 32. Furthermore, a road map 33 may also be stored within the memory 12 of the common control device 6, which may permit a central visual display of the utility systems, and the geographical relationship therebetween, to be produced.

Furthermore, since the common control device 6 can readily derive the relationship between the areas which receive these and the areas from which it is recovered, efficient heat distribution and recovery may be achieved, leading to more efficient energy saving.

Thus, in this embodiment, information about the electric power supply network, the sewage piping network, the heat supply network and road network is recorded on maps for each urban utility system. Other information regarding city facilities such as a railroad, parks, rivers, etc. may also be collectively managed by the common control means 6.

For example, in the electric power supply system, the number of consumers' houses, the amount of electric power used, and the amount of power generated at power plants are managed as attribute information of the map information system and the power line laying locations and house locations are managed as map information. Based on such information, the power station operation is controlled. The contents of the sewage piping network information of the sewage disposal system include the number of houses using the sewage system, sewage pipe locations, and the flow rate of sewage flowing through each pipe. Based on this information, the operation of the pumping station 32 and a sewage disposal facility (not shown) on the downstream side may be controlled. In a conventional heat supply system, where there is not information transfer from other utility systems, the energy supply center determines the predicted heat demand and the system produces a corresponding amount of heat. In the heat supply system of the network of this invention, however, since the heat supply network information is integrated into the information processing facility as shown in FIG. 4, it is possible to improve the prediction using common information from other utility systems.

Similarly, the common control means 6 calculates the amount of heat contained in the sewage from the sewage piping network information, i.e. the sewage flowing through each pipe and the number of houses using the sewerage system, so that the information about the amount of heat available can be derived. Based on this information, the heat supply system, considering the availability of heat from the sewage, can control the operation of the power plant 30 such that the amount of fuel used to generate heat is reduced. In this case, since the heat supplied areas and the heat recovery locations may be superimposed on the map 33 for evaluation, it is possible to determine, by simulation, optimal heat recovery locations and heat transport paths with as small a loss as possible by taking into consideration the distance that the heat should be transported through the heat transport pipes along roads, leading to more efficient energy use.

Figure 5:
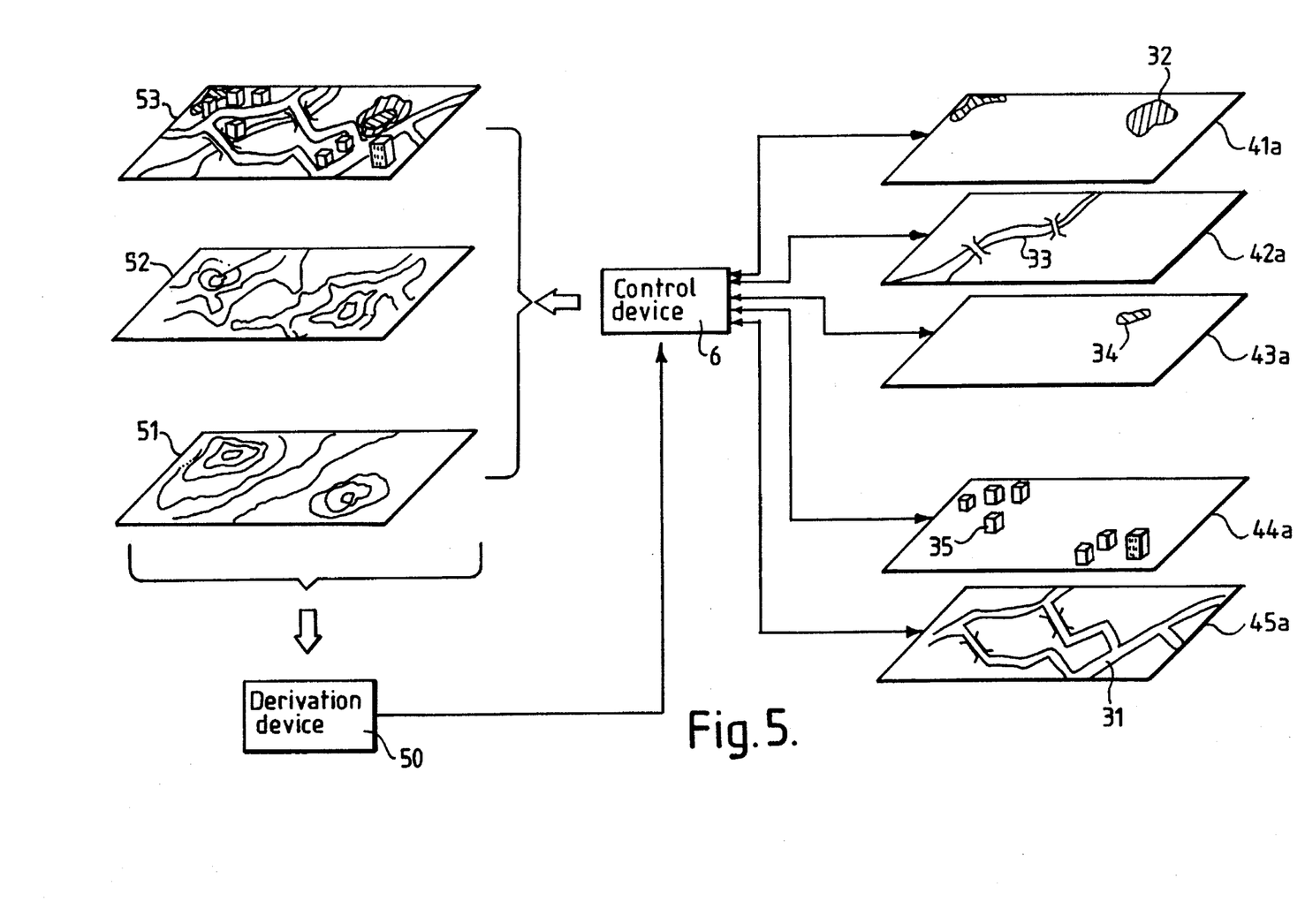
FIG. 5 shows further utilities maps which may be used in another embodiment of the present invention.

In the three embodiments discussed above, the utility systems all make use of energy-related information. However, the present invention is not limited to this, as will now be described in a fourth embodiment of the present invention. In this fourth embodiment, it is assumed that the particular systems are interconnected in a similar way to that shown in the embodiment of FIG. 3, with a common control device 6. Examples of the utility systems are then illustrated in Table 2. Based on these examples, and as shown in FIG. 5, it is assumed that the memories 21 of the utility systems have a park management map 41A, a river management map 42A, a lake-and-marsh management map 43A, a building management map 44A and a road management map 45A. These correspond to the utility systems exemplified in Table 2. Table 2 also shows the information factors that may be used in such utility systems.

The information factors are then transmitted to the common control device 6, as shown in FIG. 5, and common information may be derived. There are, in fact, several examples of such common information that can be derived, even for the utility systems exemplified in Table 2.

For example, many of the utility systems of Table 2 will make use of air temperature information. For example, parks 32, rivers 33 and lakes 34 tend to act as heat-sinks, whereas buildings 35 and roads 31 (depending on the level of traffic thereon) may act as heat sources. It is therefore possible to derive an air temperature map 51 which may be used in the operation of the utility systems. A suitable device 50 may derive information from the map 51, which information is then supplied to the common control device 6 for controlling the utility systems in a more efficient way. Furthermore, it is possible to derive information, such as expected temperature changes. For example, where the temperature is high, but the rivers are cool, there will be heat transfer out of the geographical region. Hence, this information can be used by building management systems in, e.g. control of air conditioning.

Furthermore, some of the utility systems of Table 2 will be pollution sources. For example, the traffic volume on the roads will affect the amount of pollution caused by that traffic. Similarly, building heating systems, or air conditioning systems, may themselves be the sources of pollution. Hence, a pollution distribution map 52 may be obtained, which can be used not only in control of traffic to avoid pollution build-up, but may also be an information factor used in the park management system or the river or lake-and-marsh management system. Large levels of pollution will affect the water quality in the river and lake-and-marsh systems, and may also affect the park facilities.

Furthermore, since the device 50 can derive information from the maps 51, 52, and possibly combine them with a general geographical map 53, the device 50 may produce information that may be used in, planning and environmental analysis. In the past, such analysis required complex research. With the present invention, however, constant monitoring of the urban utilities is achieved, and the networking of the information can enable appropriate analysis to be achieved more easily.

TABLE 2

|  | Park management system | River information management system | Lake and-marsh management system | Building management system | Road management system |
|---|---|---|---|---|---|
| Operation/ management information | Number of parks Areas of parks Kind of facility Kind of trees planted Number of people having visited parks | Flow rate Water temperature Shape of river bed Number and locations of bridges Height of levees Water quality | Number of lakes and marshes Areas Volume of water stored Water quality Water temperature | Number of buildings Power consumption Number of people accommodated Air-conditions temperature Elevator Parking lot | Width of road Traffic volume Traffic lights Kind of road signs |

What is claimed is:

1. A method of operating a plurality of different types of utilities in a geographical region, each of said plurality of utilities having control means for controlling the physical structure of the corresponding utility in response to a plurality of information factors related to the operation of the corresponding utility, each of said plurality of utilities determining the behavior of a different physical system of said geographical region;

wherein said method comprises the steps of:

identifying at least one first information factor of said control means of one of said plurality of utilities which is related to at least one second information factor of said control means of another of said plurality of utilities;

deriving common information from said at least one first information factor of said control means of said one of said plurality of utilities and said at least one second information factor of said control means of said another of said plurality of utilities;

supplying said common information to said control means in each of said plurality of utilities; and operating each of said plurality of utilities such that the corresponding control means uses said plurality of information factors and said common information in the control of the physical structure of the respective utility.

2. A method according to claim 1, wherein said first and second information factors are the same and correspond to said common information factor.

3. A method according to claim 1, wherein said first and second information factors are related, and said deriving of said common information comprises calculating said common information factor from said first and second information factors.

4. A method according to claim 1, wherein said identifying and deriving steps are carried out in one of said control means of said plurality of utilities.

5. A method according to claim 1, wherein said identifying and deriving steps are carried out in a common control device connected to said control means of each of said plurality of utilities.

6. A method according to claim 1, wherein said one of said plurality of utilities is an electricity supply system, said another of said utilities is a district heating and cooling system, and said step of deriving said common information deriving power dissipated.

7. A method according to claim 1, wherein said one of said plurality of utilities is a sewage disposal system, said another of said utilities is a waste disposal system, and said step of deriving common information deriving the amount of waste produced in the geographical region.

8. A method according to claim 1, wherein said one of said plurality of utilities is a surface water management system, said another of said utilities is a building management system and said step of deriving common information identifying air temperature.

9. A method according to claim 1, wherein said one of said plurality of utilities is a vehicle management system, said another of said utilities is a power generating system, and said step of deriving common information includes deriving pollution information.

10. A method according to claim 1, wherein said one of said plurality of utilities is a vehicle management system, said another of said utilities is a district heating and cooling system, and said step of deriving common information includes deriving pollution information determining the behavior of a different physical system of said geographical region.

11. A utilities network system comprising a plurality of different types of utilities in a geographical region, each of said plurality of utilities having control means for controlling the physical structure of the corresponding utility in response to a plurality of information factors related to the operation of the corresponding utility, each of said plurality of utilities including means for determining the behavior of a different physical system of said geographical region;

wherein said system further includes:

identification means for identifying at least one first information factor of said control means of one of said plurality of utilities which is related to at least one second information factor of said control means of another of said plurality of utilities;

deriving means for deriving common information from said at least one first information factor of said control means of said one of said plurality of utilities and said at least one second information factor of said control means of said another of said plurality of utilities; and supply means for supplying said common information to said control means in each of said plurality of utilities;

said control means of each of said plurality of utilities operating to control the physical structure of the corresponding utility on the basis of said plurality of information factors and said common information.

12. A utilities network system according to claim 11, wherein said identification means, said deriving means and said supply means form part of one of said control means of said plurality of utilities.

13. A utilities network system according to claim 11, having a common control device, said common control device including said identification means, said deriving means, and said supply means.

14. A utilities network system according to claim 11, wherein said one of said plurality of utilities is an electricity supply system, and said another of said plurality of utilities is a district heating and cooling system.

15. A utilities network system according to claim 11, wherein said one of said plurality of utilities is a sewage disposal system, and said another of said plurality of utilities is a waste disposal system.

16. A utilities network system according to claim 11, wherein said one of said plurality of utilities is a surface water management system, and said another of said plurality of utilities is a building management system.

17. A utilities network system according to claim 11, wherein said one of said plurality of utilities is a vehicle management system, said another of said plurality of utilities is a power generating system.

18. A utilities network system according to claim 11, wherein said one of said plurality of utilities is a vehicle management system and said another of said plurality of utilities is a district heating and cooling system.

19. A control device for controlling the physical structure of a utility in a utilities network system, having a plurality of utilities for supplying respective services, said control device comprises:

identification means for identifying at least one first information factor of a first one of said plurality of utilities which is related to at least one second information factor of a second one of said plurality of utilities, each information factor being related to the operation of a utility;

derivation means for deriving common information from said at least one first information factor; and supply means for supplying said common information to each of said plurality of utilities for use in controlling the physical structure thereof.

* * * * *